United States Patent [19]
Shanks

[11] Patent Number: 5,629,796
[45] Date of Patent: May 13, 1997

[54] IMAGE FRAME

[75] Inventor: Ian A. Shanks, Penn, England

[73] Assignee: Central Research Laboratories Limited, Hayes, England

[21] Appl. No.: 256,438
[22] PCT Filed: Jan. 12, 1993
[86] PCT No.: PCT/GB93/00054
  § 371 Date: Jul. 12, 1994
  § 102(e) Date: Jul. 12, 1994
[87] PCT Pub. No.: WO93/13699
  PCT Pub. Date: Jul. 22, 1993

[30] Foreign Application Priority Data

Jan. 13, 1992 [GB] United Kingdom .................... 9200584

[51] Int. Cl.$^6$ .................... G02B 27/22; G02B 27/10; A47G 1/06; B44C 5/02
[52] U.S. Cl. .................... 359/463; 359/619; 359/620; 40/768; 40/775
[58] Field of Search .................... 359/40, 463, 464, 359/466, 477, 601, 619; 40/154, 158.1

[56] References Cited

U.S. PATENT DOCUMENTS

| 3,357,773 | 12/1967 | Rowland | 359/627 |
| 3,582,961 | 6/1971 | Shindo | 348/44 |
| 5,052,783 | 10/1991 | Hamada | 359/40 |

*Primary Examiner*—Paul M. Dzierzynski
*Assistant Examiner*—Audrey Chang
*Attorney, Agent, or Firm*—Keck, Mahin & Cate

[57] ABSTRACT

A frame 2 for an image such as a picture 16 is formed from a microlens array. Such an array produces an apparent optical plane which is not coplanar with the real plane of the array. This produces the visual effect of the picture 16 being divorced from the frame 2 and an illusion of depth is created as between the frame 2 and the picture 16.

3 Claims, 2 Drawing Sheets

IMAGE FRAME

This application is a National Stage under 35 USC §371 of a PCT/GB93/00054 filed on Jan. 12, 1993.

BACKGROUND OF THE INVENTION

1. Field of the Invention

The present invention relates to image frames and has particular, although not exclusive, relevance to frames surrounding pictures for display in order to increase the depth effect in those pictures.

2. Description of the Prior Art

Frames for images have long been known. Examples in the art are most frequently encountered when employed for decorative purposes such as wooden frames forming loops around paintings or photographs or the like. Although the purpose of such frames is primarily a decorative effect, they also serve to provide the viewer with an enhanced contrast between the picture and the surrounding scenery, such as a wall. Such contrast provides the visual effect of the picture seeming to stand alone and be somewhat divorced from the surrounding scenery.

An example of an image frame which attempts to suppress the real plane of the image surrounded thereby by suppressing the stereoscopic cues in the area surrounding the picture is given in U.S. Pat. No. 4,651,219. In this document there is disclosed an image frame having a concave cross-sectional configuration, the optical surfaces of which are blackened thereby to minimise light reflection therefrom. In this way the image which is bordered by the frame appears to hang in space because the frame itself is substantially invisible to an observer.

Even when allowance is made for the enhanced contrast gained by the employment of such frames, it is still apparent to the viewer that both the picture and the frame are substantially coplanar, and that the picture is flat or two dimensional. Furthermore, in the case of a painting mounted within a frame and placed on a wall, then the picture, frame and the wall are all generally coplanar.

Being substantially coplanar precludes any significant parallax effect to be observed by the viewer.

It is thus an object of the present invention to at least alleviate the lack of parallax effects observed when viewing a framed image. If parallax effects can be observed, then the viewed image may be perceived by the viewer to possess at least a degree of three-dimensional or depth quality. The properties associated with such an effect rely partially on the suppression of binocular depth cues, which will be appreciated by those skilled in the art and so detailed reference thereto will not herein be made.

SUMMARY OF THE INVENTION

According to a first aspect of the present invention there is provided an image frame characterised by comprising at least one microlens array member arranged to form a substantially closed structure for surrounding an image to be framed.

A microlens array can possess the property of having an apparent optical plane which is not coplanar with the real plane of the array. Thus, by flaming an image with such a microlens array, the frame and the image apparently lie in different planes and hence a parallax effect may be observed as between the image and the frame without the frame obscuring the image so that the arrangement may be viewed from a range of angles.

Advantageously the microlens array member comprises two microlens arrays of differing pitch, one overlying the other. Alternatively the microlens array member may be arranged to overlie an integral photographic image.

Preferably, the image to be framed lies in an optical plane and the microlens array is coplanar therewith. In this way, the image and frame can be arranged to form a physically flat structure, and yet be optically multi-planar.

Additionally or alternatively, the image frame may comprise a plurality of microlens array members arranged in juxtaposition such that the apparent planes of respective adjacent members lie on opposite sides of the real planes thereof.

According to a further aspect of the present invention there is provided a method of providing a two-dimensional image with an apparent perception of depth characterised by surrounding the image to be framed with a substantially closed structure of at least one microlens array member having an apparent plane which is not coplanar with the real plane of the image to be framed.

BRIEF DESCRIPTION OF THE DRAWING

The invention will now be described, by way of example only, by reference to the accompanying drawings, of which.

DESCRIPTION OF THE PREFERRED EMBODIMENTS

Figure 1:
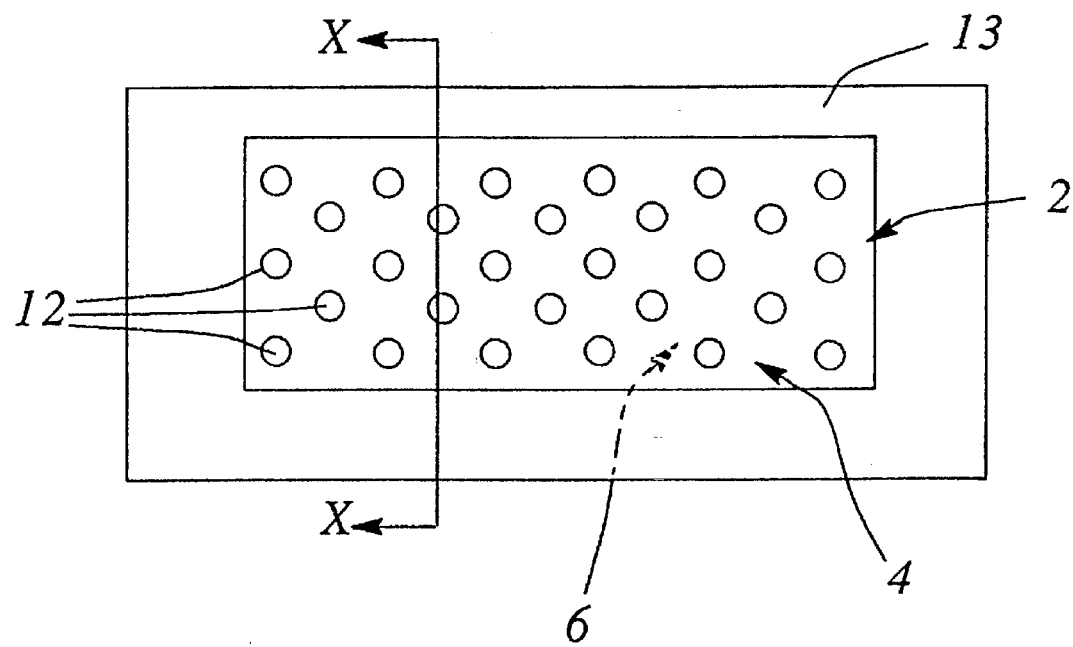
FIG. 1 shows a schematic representation of a planar sheet microlens array.
Figure 2:
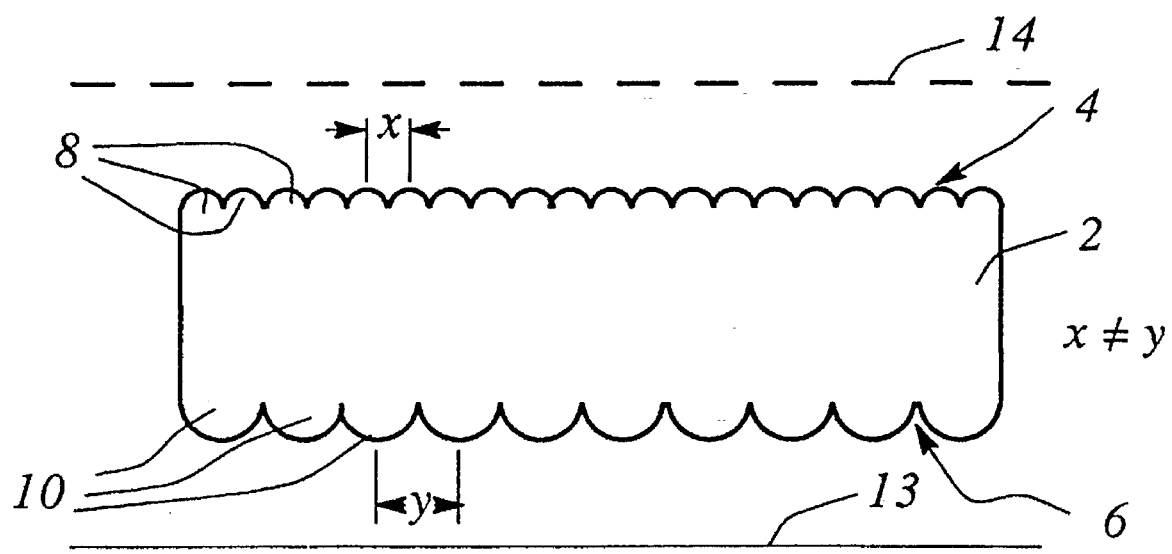
FIG. 2 shows a section through line X—X of FIG. 1.

Referring firstly to FIGS. 1 and 2, it will be seen that a microlens array member in the form of a planar plastics sheet 2 such as ROWLUX (RTM) available via the Rowland Development Corporation and having two major microlens array surfaces 4 and 6, has indented or formed thereon a plurality of paraboloidal or spherical lenses 8 and 10 respectively. The pitch x of lenses 8 on surface 4 of the sheet 2 is not the same as the pitch y of lenses 10 on surface 6 of the sheet 2. This requirement will be well understood of microlens arrays. Furthermore, it will be appreciated that x may not differ from y by substantially more than ±10% of y.

The visual effect of the unequal pitches x and y is to create a form of Moire interference pattern. This is manifest as a plane of "bubbles" of circular, elliptical or hexagonal shape 12, which plane lies either above or below the real plane of the sheet 2 in dependence upon whether viewed from surface 4 or surface 6. In the example given, when the sheet 2 is viewed from surface 4 the apparent plane of the "bubbles" 12 is above the sheet 2 at 14. When viewed from surface 6, the apparent plane of the bubbles 12 is below the sheet 2 at 13.

It is this property of a microlens array, namely the ability to provide an apparent optical surface which is not coplanar with the real surface of the array which is utilised in the present invention.

Figure 3:
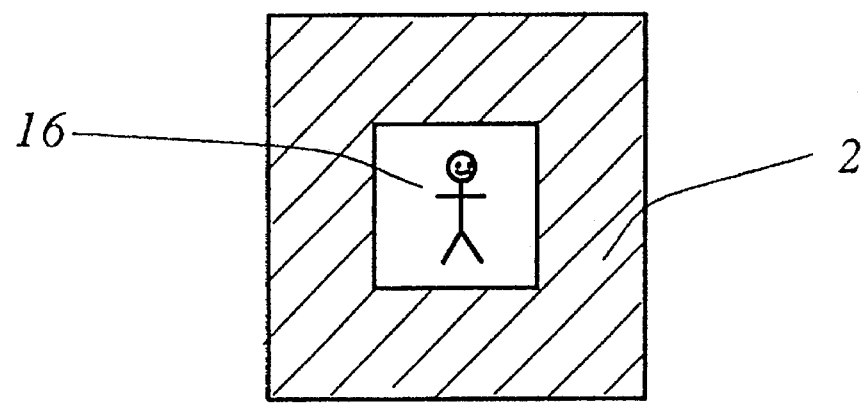
FIG. 3 illustrates schematically a picture framed with a microlens array.

Reference now also to FIG. 3 illustrates this. An image such as a picture 16 for framing is totally surrounded by the microlens array sheet 2. In FIG. 3 both the picture 16 and the sheet 2 are coplanar, although this is not essential. The invention is utilisable even if the picture 16 and the sheet 2 are in different planes, but some obscuration may then be observed due to the real parallax between the sheet 2 and the picture 16.

Because the microlens array sheet 2 has an apparent optical plane which, depending on the orientation of the major surfaces 8 and 10, can be either above or below the real plane of both the sheet and the picture 16, then the picture 16 appears to be mounted either above or below its frame, that is sheet 2.

Furthermore, because the plane of the "bubbles" 12 is perceived as being either above or below sheet 2, then relative movement between a viewer and the picture/sheet combination will cause the "bubbles" 12 to apparently move. This parallax effect may cause the viewer to believe that the picture 16 is actually mounted above or below its frame, i.e. sheet 2; and also this effect is manifest because of the apparent plane of the "bubbles" 12 not being coplanar with the real plane of sheet 2. The effect is particularly noticeable if the sheet 2 overlies an opaque or absorbing layer, such as black sheet 13.

Figure 4:
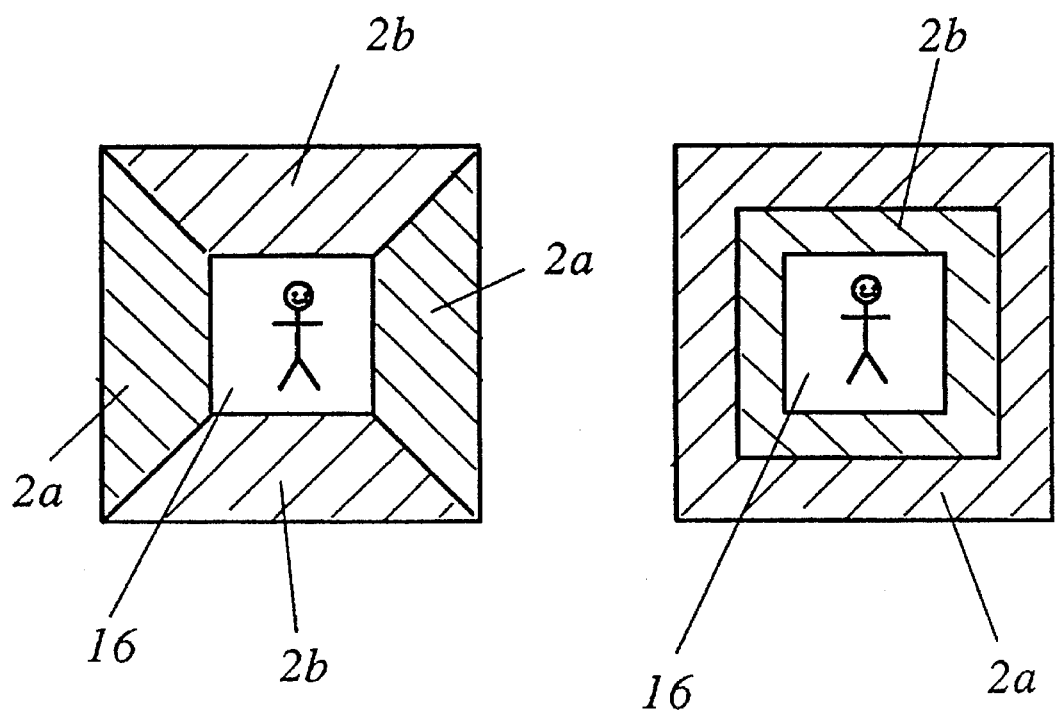
FIG. 4 illustrates an alternative frame to that of FIG. 3.

This effect may also be achieved by a different arrangement of microlens array sheets such as illustrated in FIG. 4. Here it will be seen that sheets 2a having the apparent plane of "bubbles" 12 above the real plane of sheet 2 are interspersed with sheets 2b having the apparent plane of "bubbles" 12 below the real plane of sheet 2. The sheets 2a,2b are arranged totally to surround picture 16. The visual effect of such an arrangement is to provide a picture 16 framed by a frame structure 2a,2b and which arrangement is apparently tri-planar, the three planes being firstly the real plane of picture 16 and sheets 2a,2b; secondly the apparent plane of sheet 2a; and thirdly the apparent plane of sheet 2b. The effect of this is to create a more pronounced illusion of parallax and depth than with the arrangement of FIG. 3.

It will be appreciated that the efficiency and visual effect of the present invention is governed by the ability of the microlens array sheet 2 to provide an apparent difference in planes as between the picture 16 and its surrounds. For this to be effective, it is necessary to ensure a correlation exists between the dimensions of the image to be framed, such as picture 16, and the apparent depth or protrusion of the "bubbles" 12 of the microlens array. It has been found that a microlens array sheet 2 exhibiting an apparent difference between the real and apparent planes thereof to the order of 20 mm is sufficient to frame a picture 16 of dimensions up to the order of 250×200 mm.

If the dimensions of the picture 16 are increased substantially beyond this range, then a corresponding increase in the apparent depth of the "bubbles" 12 needs to be achieved. This may be provided by altering either or both of the pitch x, y and size focal lengths, or front to back separation of the microlens 8 and/or 10. This will be readily apparent to one skilled in the art.

Furthermore, it will be appreciated that the greater the distance between the viewer and the picture/frame combination, up to a point wherein the perceived strength of the flatness cues is sufficiently attenuated then the more pronounced the depth and "bubble" effect of the microlens array needs to be. Once more, this may be achieved by varying the physical arrangement of the microlens array.

In the foregoing, reference to in, age includes references to static/dynamic images, projection images, pictures, or indeed any such image containing sufficient depth cues as may form the basis for the display.

Whilst in the above example the microlens array member took the form of a sheet 2 comprising two microlens arrays 4 and 6, the present invention may also be carried out by replacing one of the microlens arrays 2 or 4 with an integra photographic image. This is illustrated by still referring to FIG. 2, because the schematic representation of an integral photographic image would appear no different from the illustration of either array 2 or 4, thus no separate illustration is made. This will be understood by those skilled in the art.

In the present example, array 6 is replaced by an integral photographic image, in this case an integral photograph of a picture frame. It will be appreciated that the combined effect of the photograph of a picture frame and the overlying microlens array 4 will be similar to that described hereabove except that "bubbles" 12 will no longer be seen, but rather an image of a picture frame apparently in a different plane to that of picture 16.

Integral photography is a well-known technique illustrated, for example in publication Applied Optics, vol 10, No. 10, October 1971 pp 2284–2291.

It will be apparent that the frame formed by the microlens array around the image should ideally be a substantially closed structure, that is, there should preferably be no significant gaps between the periphery of the image and the microlens structure; otherwise the depth effect may suffer to such an extent as to become unnoticeable. This will be understood because one of the purposes of the microlens array is to create a substantial planar difference between the image and the frame therefore.

It will be further appreciated by those skilled in the art that there is no necessity for the image and the frame to be coplanar.

Those skilled in the art will readily appreciate that the term microlens is apt to include all optical lens-type structures having radial dimensions within the micrometer to millimeter range. This term is also valid to apply to cylindrical lenses, such as those termed lenticular and the like.

Modifications to the above disclosure may be made whilst still remaining within the scope of the invention as defined by the claims. For example the microlens array member 2 need not be a planar member. Any structure exhibiting the necessary optical properties will suffice. A further example of a modification falling within the scope of the present invention is to project an image onto a sheet of microlens array. In this way, the optical effect of framing the image by a closed microlens structure with no gaps between the image and the frame is still achieved.

It will be apparent that the present invention permits viewing over a wide range of angles, such as ±40° to the normal to the image.

The present invention has been found to be particularly suitable for framing flat liquid crystal display panels and the like.

I claim:

1. A frame for substantially enclosing the circumference of an image, the frame comprising a pair of arrays each comprising a plurality of paraboloidal or spherical lens type structures having a radial dimension within the micrometer to millimeter range, the arrays being superimposed on and spaced from one another, said arrays combining to form a resultant "bubble-like" pattern in a different plane to either array.

2. A frame according to claim 1 wherein the pair of arrays is one of a plurality of pairs of arrays arranged substantially in a common plane in juxtaposition such that the resultant patterns from respective pairs of arrays lie on opposite sides of said common plane.

3. An image together with a frame according to claim 1 or claim 2.

* * * * *